United States Patent
Marupaduga

(10) Patent No.: US 11,425,770 B1
(45) Date of Patent: Aug. 23, 2022

(54) USE OF UPLINK MU-MIMO GROUPING EFFICIENCY AS BASIS TO CONTROL SPLIT-UPLINK-MODE OPERATION FOR DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 150 days.

(21) Appl. No.: 16/946,864

(22) Filed: Jul. 9, 2020

(51) Int. Cl.
| | |
|---|---|
| H04W 72/04 | (2009.01) |
| H04W 76/15 | (2018.01) |
| H04B 7/0452 | (2017.01) |
| H04W 92/10 | (2009.01) |

(52) U.S. Cl.
CPC .......... H04W 76/15 (2018.02); H04B 7/0452 (2013.01); H04W 92/10 (2013.01)

(58) Field of Classification Search
None
See application file for complete search history.

(56) References Cited

U.S. PATENT DOCUMENTS

| | | | |
|---|---|---|---|
| 9,980,152 B2* | 5/2018 | Laselva | H04W 16/14 |
| 10,045,360 B2* | 8/2018 | Sang | H04W 72/085 |
| 10,368,384 B2* | 7/2019 | Ali | H04L 5/0032 |
| 10,439,686 B1* | 10/2019 | Marupaduga | H04B 7/088 |
| 10,659,116 B1* | 5/2020 | Silverman | H04L 27/0008 |
| 11,166,201 B1* | 11/2021 | Marupaduga | H04W 24/02 |
| 2014/0051471 A1* | 2/2014 | Comeau | H04W 28/06 455/509 |
| 2015/0271713 A1* | 9/2015 | Kim | H04W 72/04 455/437 |
| 2016/0088542 A1* | 3/2016 | Belghoul | H04W 76/15 370/331 |
| 2017/0164281 A1* | 6/2017 | Chiba | H04W 72/0446 |
| 2018/0234916 A1* | 8/2018 | Song | H04W 48/18 |
| 2018/0279192 A1* | 9/2018 | Raissinia | H04W 36/08 |
| 2019/0058570 A1* | 2/2019 | Zhang | H04W 76/27 |
| 2019/0141770 A1* | 5/2019 | Takahashi | H04W 8/24 |
| 2019/0335379 A1* | 10/2019 | Joseph | H04L 1/189 |
| 2019/0373670 A1* | 12/2019 | Panchai | H04W 76/34 |
| 2020/0245390 A1* | 7/2020 | Ali | H04W 36/0069 |
| 2021/0182658 A1* | 6/2021 | Wang | H04L 5/001 |

* cited by examiner

*Primary Examiner* — Sithu Ko

(57) ABSTRACT

A method and system for controlling dual-connectivity service in a system where a first access node provides service on a first air interface and a second access node provides service on a second air interface, and where (i) in a single-connection-uplink mode for the dual-connectivity service, uplink user-plane communication is carried on just the second air interface and (ii) in a split-uplink mode for the dual-connectivity service, uplink user-plane communication is split between the first air interface and the second air interface. An example method includes determining an uplink Multi-User Multiple-Input-Multiple-Output (MU-MIMO) grouping efficiency of the second air interface and, based on the determined uplink MU-MIMO grouping efficiency of the second air interface, controlling whether to provide the dual-connectivity service in the single-connection-uplink mode or rather in the split-uplink mode.

17 Claims, 5 Drawing Sheets

USE OF UPLINK MU-MIMO GROUPING EFFICIENCY AS BASIS TO CONTROL SPLIT-UPLINK-MODE OPERATION FOR DUAL-CONNECTIVITY SERVICE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

Overview

When a UE enters into coverage of such a system, the UE could detect threshold strong coverage of an access node (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

When the industry advances from one generation of wireless technology to the next, or in other scenarios, networks and UEs may also support dual-connectivity service, where a UE is served on co-existing connections, perhaps according to multiple different RATs.

For instance, a first access node could provide service according to a first RAT and a second access node could provide service according to a second RAT, and a UE positioned concurrently within coverage of both the first and second access nodes could have a first radio configured to engage in service according to the first RAT and a second radio configured to engage in service according to the second RAT. With this arrangement, the UE within coverage of both access nodes may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection (as "standalone" connectivity).

In a representative dual-connectivity implementation, the first access node operating according to the first RAT ("first-RAT access node) could function as a primary access node or master node (MN), responsible for coordinating setup and teardown of dual-connectivity service for the UE and functioning as an anchor point for RRC signaling and core-network control signaling related to the dual-connected UE. And the second access node operating according to the second RAT ("second-RAT access node") could function as a secondary access node or secondary node (SN) mainly to provide additional connectivity and increased aggregate bandwidth for the UE.

In such an implementation, when the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

In an example of this process, the MN could first identify an SN with which to establish the second-RAT connection for the UE, perhaps based on the UE reporting that the UE is within threshold strong coverage of the SN or based on an assumption (in certain situations) that the UE being in coverage of the MN means the UE is likely also in coverage of the SN.

Further, the MN could then engage in an SN-addition process to add for the UE a second-RAT connection with the SN. For instance, the MN could transmit over an X2 interface or other inter-access-node interface to the SN an SN-addition request message, providing RRC configuration information and/or other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

In addition, for some dual-connectivity implementations, the MN could also engage in signaling process to transfer the access-bearer portion of one or more of the UE's bearer(s) from being between the gateway system and the MN to instead being between the gateway system and the SN. For instance, the MN could include in its SN-addition request to the SN information about the access bearer, and the MN could transmit to the core-network controller a bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above.

In an example implementation, downlink user-plane data flow would be split between the UE's two connections. For instance, when the gateway system receives data destined to the UE, that data could flow over a UE bearer from the gateway system to the SN, and the SN and MN could then share transmission of that data to the UE. Namely, the SN could send a portion of the data over an X2 interface or the like to the MN, and the MN could schedule and provide transmission of that portion of data to the UE on one or more downlink PRBs of the UE's first-RAT connection. And the SN could itself schedule and provide transmission of another portion of the data to the UE on one or more downlink PRBs of the UE's second-RAT connection.

But in the example implementation, uplink user-plane data flow may or may not be split between the UE's two connections. In particular, the system could be configured to serve the UE in either a "single-connection-uplink mode" or a "split-uplink mode" mode.

In the single-connection-uplink mode, the UE's uplink data flow would be limited to just one of the UE's two connections, perhaps just the UE's second-RAT connection with the SN for instance. Thus, when the UE has data to transmit, the UE could send a scheduling request to just the access node providing that one connection, the access node could schedule transmission of the data from the UE on PRBs of that connection as noted above, the UE could accordingly transmit the data on the PRBs as scheduled, and the data could flow over a UE bearer to the gateway system.

Whereas, in the split-uplink mode, the UE's uplink data flow would be split between the UE's two connections, perhaps when there is or will be sufficient uplink data flow from the UE to justify doing so. Thus, when the UE has data to transmit, the UE could send to the MN a scheduling request for transmission of a portion of the data, the MN could schedule transmission of that portion of the data from the UE on one or more uplink PRBs of the UE's first-RAT connection, the UE could accordingly transmit that portion of the data to the MN as scheduled, the MN could forward that portion of the data to the SN, and that portion of data could flow over a UE bearer to the gateway system. And the UE could send to the SN a scheduling request for transmission of another portion of the data, the SN could schedule transmission of that other portion of the data from the UE on one or more uplink PRBs of the UE's second-RAT connection, the UE could accordingly transmit that other portion of the data to the SN as scheduled, and the that other portion of data as well could flow over a UE bearer to the gateway system.

In a system where application of the single-connection-uplink mode would limit uplink user-plane communication to the air interface of a given one of the access nodes (e.g., to the SN's air interface), application of the split-uplink mode instead of the single-connection-uplink mode could be especially useful if that access node's air interface has particularly high uplink load (e.g., high uplink PRB utilization). Namely, application of split-uplink mode in that situation could optimally offload some uplink data flow to the other access node's air interface (e.g., to the MN's air interface), which could help to mitigate the uplink load issue.

One relevant consideration here could be the level of uplink spectral efficiency of the air interface to which uplink communication would be limited in the single-connection-uplink mode.

Uplink spectral efficiency of an air interface is a measure of the extent of data that the air interface can carry on the uplink per unit of frequency spectrum, typically represented as a quantity of bits per Hertz. In general, if an air interface tends to have relatively high uplink spectral efficiency, then the air interface may likely be able to carry more data on the uplink per unit time than if the air interface had a relatively low uplink spectral efficiency.

Therefore, if the air interface to which uplink communication would be limited in the single-connection-uplink mode tends to have relatively high uplink spectral efficiency, then there may be relatively little reason to offload some uplink data flow from that air interface to the other access node's air interface, and therefore there may be relatively little reason to apply the split-uplink mode for dual-connectivity service.

One way to gauge the level of uplink spectral efficiency of an access node's air interface is by considering of the extent to which the access node is able to apply uplink multi-user MIMO (MU-MIMO) service on the air interface.

With uplink MU-MIMO, an access node can receive air-interface transmissions from a group of UEs concurrently on respective different RF propagation paths, or MIMO layers, with the multiple layers occupying the same air-interface resources (e.g., resource elements and PRBs) as each other. To facilitate this, the access node could arrange to have each UE pre-code its transmissions to the access node using weighted coefficients based on channel estimates, among possibly other techniques to help distinguish the UEs' transmissions from each other. Because these concurrent transmissions occupy the same frequency resources as each other, uplink MU-MIMO can thereby help to support a greater extent of data communication per unit frequency, thus increasing the spectral efficiency and data capacity of the access node's air interface.

In an example implementation of uplink MU-MIMO, the access node could be configured with a massive-MIMO antenna array. While a traditional MIMO antenna array may include on the order of 2 to 8 antennas, a massive-MIMO antenna array may include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 receive antennas are used per layer, the massive-MIMO antenna array might support on the order of 16 layers, to facilitate concurrent from up to 16 UEs (e.g., 8 UEs with 2 layers apiece, or 16 UEs with 1 layer apiece).

To facilitate providing uplink MU-MIMO service, it would be best if the UEs that would transmit on the same air-interface resources as each other would be sufficiently "orthogonal" to each other, such that each UE could provide spatially separate transmissions to the access node without undue interference from each other UE's transmissions. The access node could deem UEs to be sufficiently orthogonal to each other if each UE has reported threshold high signal-to-noise-plus-interference ratio (SINR), and/or if the UEs are located at positions that are physically separate enough from each other that their RF transmission paths to the access node would likely have sufficient angular separation, among other possibilities.

Thus, when an access node is going to apply uplink MU-MIMO (perhaps in response to the access node being heavily loaded with connected UEs with high uplink throughput requirements, or perhaps as a proactive measure), the access node could work to group its connected UEs for uplink MU-MIMO service. On a per TTI basis for instance, the access node could evaluate the UEs to establish one or more uplink MU-MIMO groups, with each uplink MU-MIMO group consisting respectively of two or more of the access node's connected UEs deemed to be sufficiently orthogonal to each other. And for each group, the access node could then coordinate MU-MIMO transmission from the UEs of the group respectively on the same PRBs as each other.

Because an access node's application of uplink MU-MIMO could increase the uplink spectral efficiency of the access node's air interface, and because the orthogonality of the access node's served UEs may vary over time, the access node's spectral efficiency may vary over time.

At times when the access node is able to serve a greater number of the access node's connected UEs with uplink MU-MIMO service (e.g., when the access node's connected UEs are more spread apart from each other and/or otherwise are more orthogonal to each other), the uplink spectral efficiency of the access node may be greater, and the access node's overall uplink resource availability for serving UEs may be greater. Whereas, at times when the access node can serve fewer connected UEs with MU-MIMO service (e.g., because they are not sufficiently orthogonal), the spectral efficiency of the access node may be lower, and the access node's overall resource availability for serving UEs may be lower.

The present disclosure provides an improvement to help leverage this uplink MU-MIMO grouping efficiency in the context of controlling whether to apply split-uplink mode or rather single-connection-uplink mode for dual-connectivity service.

The disclosed improvement could be implemented in a system where first and second access nodes support cooperatively providing dual-connectivity service and support serving dual-connected UEs in the single-connection-uplink mode and in the split-uplink mode. In such an arrangement, a computing system could determine a measure of the uplink MU-MIMO grouping efficiency on the air interface that would be used for dual-connectivity service in the single-connection-uplink mode, and the computing system could use that determined uplink MU-MIMO grouping efficiency as a basis to control whether dual-connected UEs would operate in the single-connection-uplink mode or rather in the split-uplink mode.

By way of example, the improvement could apply in a system as described above, where an MN and SN support cooperatively providing dual-connectivity service and support (i) serving each of one or more dual-connected UEs in the single-connection-uplink mode where the UE's uplink communication would be limited to the SN's air interface and (ii) serving each of one or more dual-connected UEs in the split-uplink mode where the UE's uplink communication would be split between the MN's air interface and the SN's air interface.

In that arrangement, a computing system at the MN or elsewhere could determine the uplink MU-MIMO grouping efficiency of the SN's air interface, and the computing system could use that determined MU-MIMO grouping efficiency as a basis to control whether to have UEs that are served with dual-connectivity by the MN and the SN operate in the single-connection-uplink mode or rather in the split-uplink mode.

For instance, if the determined uplink MU-MIMO grouping efficiency of the SN's air interface is threshold high, then the computing system could responsively cause one or more such dual-connected UEs to operate in the single-connection-uplink mode, as the high uplink MU-MIMO grouping efficiency may represent relatively high spectral efficiency and associated data capacity, which may suggest less of a need to offload uplink data to the MN's air interface. Whereas, if the determined uplink MU-MIMO grouping efficiency of the SN's air interface is not threshold high (e.g., is threshold low), then the computing system could instead responsively cause the one or more dual-connected UEs to operate in the split-uplink mode, to offload some of their uplink data flow to the MN's air interface.

In an example implementation, the computing system could implement this process generally for dual-connectivity service provided by the MN and SN or specifically per UE served with dual-connectivity by the MN and SN.

For instance, if and when the MU-MIMO grouping efficiency of the SN's air interface is threshold high, the computing system could generally disable the split-uplink mode for UEs served with dual connectivity by the MN and SN, so that those UEs would operate in the single-connection-uplink mode, and/or the computing system could disable the split-uplink mode on a per-UE basis. Whereas, if and when the MU-MIMO grouping efficiency of the SN's air interface is not threshold high, the computing system could generally enable the split-uplink mode so as to facilitate having UEs served with dual connectivity by the MN and SN operate in the split-uplink mode, and/or the computing system could enable the split-uplink mode on a per UE basis.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
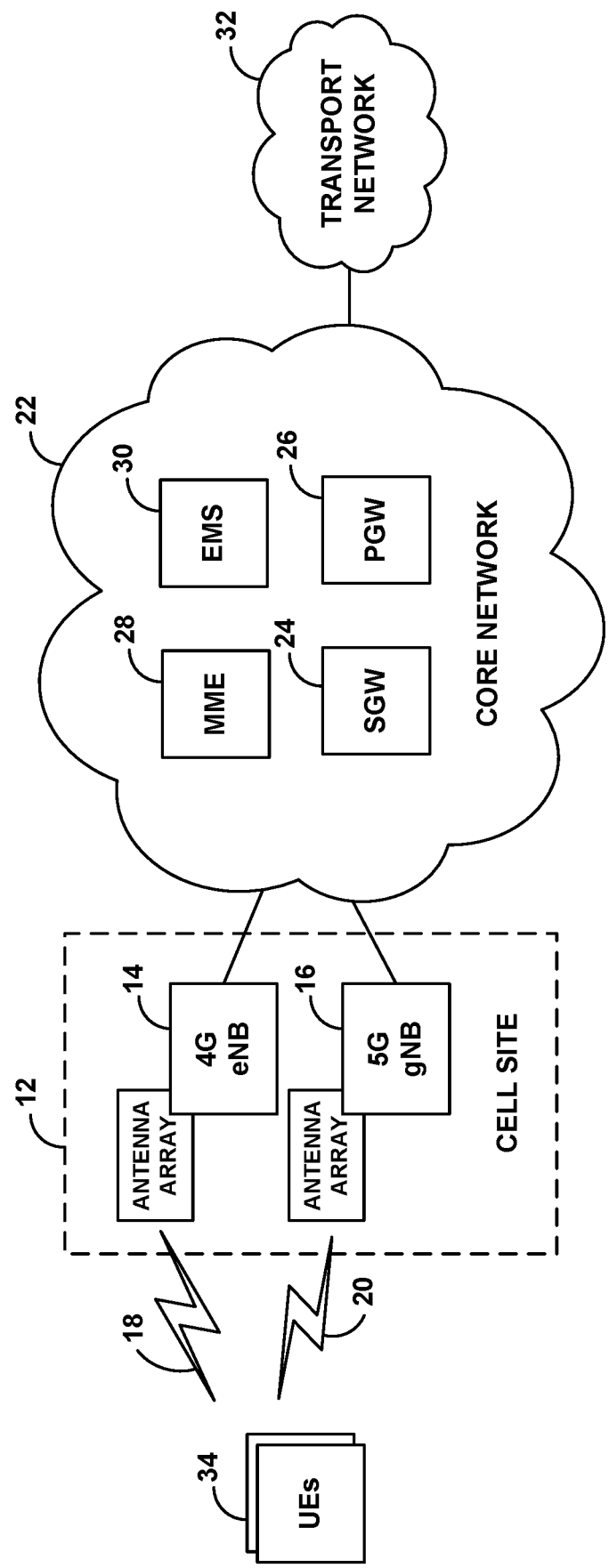
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, relays, femtocell access nodes, or the like, possibly configured to provide a smaller range of coverage.

Each access node could have a respective antenna array that is configured to transmit and receive electromagnetic signals in a region defined by an antenna pattern or radiation pattern, or the access nodes could share portions of a common antenna array for this purpose. Further, each access node could be configured to provide coverage on at least one respective carrier according to a respective RAT. For instance, the 4G eNB 14 could provide 4G coverage 18 on one or more 4G carriers, and the 5G eNB 16 could provide 5G coverage 20 on one or more 5G carriers.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 14 and 5G gNB 16 are both interfaced with a core network 22, such as an Evolved Packet Core (EPC) network or Next Generation Core (NGC) network. In the example shown, the core network 22 includes a serving gateway (SGW) 24, a packet data network gateway (PGW) 26, a mobility management entity (MME) 28, and an element management system (EMS) 30, although other arrangements are possible as well.

In an example implementation, without limitation, each access node could have an interface with the SGW 24, the SGW 24 could have an interface with the PGW 26, and the PGW 26 could provide connectivity with a transport network 32. Further, each access node could have an interface with the MME 28, and the MME 28 could have an interface with the SGW 24, so that the MME 28 could coordinate setup of bearers for UEs to enable the UEs to engage in packet-data communication via 4G and 5G. Alternatively, just the 4G eNB 14 might have an interface with the MME 28 and may function as an anchor for signaling with the MME 28 both for 4G service and for 5G and EN-DC service. Still further, the EMS 30 could operate as a central repository of operational data for the wireless communication network and to control and manage operation of various network elements such as the access nodes.

FIG. 1 also illustrates multiple example UEs 34 that may from time to time be within coverage of the 4G eNB 14 and/or the 5G gNB 16. Some or all these UEs could be equipped with a 4G LTE radio and/or a 5G NR radio, and could include associated circuitry and logic that enables the UE to engage in 4G LTE service and/or 5G NR service, and perhaps EN-DC service. Further, the 4G eNB 14 and 5G gNB 16 could be configured to serve multiple such UEs at once.

Upon entering into coverage of cell site 12, a representative such UE could scan for and discover coverage and could then responsively engage in signaling to establish an RRC connection. For instance, if the UE supports just 4G service or if the UE supports EN-DC service, the UE might initially scan for 4G coverage and discover threshold strong coverage of 4G eNB 14, and the UE may then responsively engage in random access and RRC signaling with the 4G eNB 14 to establish a 4G connection between the UE and the 4G eNB 14. Whereas, if the UE supports just 5G service, the UE might initially scan for 5G coverage and discover threshold strong coverage of the 5G gNB 16, and the UE may then responsively engage in random access and RRC signaling with the 5G gNB 16 to establish a 5G connection between the UE and the 5G gNB 16.

Once the UE is connected with an access node, the UE could then transmit to the access node an attach request message, which the access node could forward to the MME 28 for processing. And upon authenticating and authorizing the UE for service, the MME 28 and access node could coordinate setup for the UE of at least one user-plane bearer. For instance, the MME 28 could engage in signaling with the access node and the SGW 24 to coordinate setup for the UE of an S1-U packet tunnel between the access node and the SGW 24, and the SGW 24 could responsively engage in signaling with the PGW 26 to coordinate setup for the UE of an associated S5 packet tunnel between the SGW 24 and the PGW 26. Further, the access node could engage in signaling with the UE to establish for the UE an associated data radio bearer (DRB). And once the UE is so connected and attached, the access node could then serve the UE in a standalone mode, as discussed above.

For each of one or more of these UEs that connects with the 4G eNB 14, the 4G eNB 14 could also transmit to the UE an RRC message carrying a UE-capability enquiry, and the UE could respond to the 4G eNB 14 with a "UE capability information" information element (IE), which could indicate whether the UE is EN-DC capable. Alternatively, the 4G eNB 14 could discover in another manner whether the UE is EN-DC capable.

For each such EN-DC capable UE, the 4G eNB 14 could then work to configure EN-DC service. In line with the discussion above, for instance, the 4G eNB 14, operating as MN, could first engage in process to add the 5G gNB 16 as an SN for the UE, such as by transmitting to the 5G gNB 16 an SN-Addition request to cause the 5G gNB to allocate resources for a 5G connection for the UE on one or more 5G carriers, receiving an SN-Addition-Request acknowledge message from the 5G gNB 16, and engaging in associated RRC signaling with the UE, in response to which the UE could then access and complete establishment of the 5G connection. Further, the 4G eNB 14 could engage in signaling as described above to transfer to the UE's access bearer (e.g., the UE's S1-U tunnel) to the 5G gNB as well.

The 4G eNB 14 and 5G gNB 16 could then provide the UE with EN-DC service, concurrently serving the UE over their respective connections with the UE. Namely, the 4G eNB 14 could allocate PRBs of its 4G air interface as needed to carry data over the 4G connection between the 4G eNB 14 and the UE, and the 5G gNB could allocate PRBs of its 5G air interface as needed to carry data over the 5G connection between the 5G gNB 16 and the UE.

Further in line with the discussion above, the 4G eNB 14 and 5G gNB 16 (e.g., cell site 12) could be configured to support serving EN-DC-connected UEs in the split-uplink mode or in the single-connection-uplink mode. The choice between these modes of operation could be made on a per-UE basis and/or according to general policy applicable to multiple UEs. And the 4G eNB 14, as MN, could coordinate associated operation of the UE, through RRC signaling directives to the UE.

In an example implementation, serving an EN-DC-connected UE in the single-connection-uplink mode could involve limiting the UE's uplink communication to be on just the UE's 5G connection with the 5G gNB 16. To facilitate this, the 4G eNB 14 could transmit to the UE an RRC message that directs the UE to limit all of its uplink user-plane communication to be with just the 5G gNB 16. Accordingly, when the UE has data to transmit, the UE could send scheduling requests to the 5G gNB 16, the 5G gNB 16 could allocate uplink PRB(s) of the 5G gNB's air interface to carry the data, and the UE could according transmit the data on the allocated PRB(s) to the 5G gNB 16.

On the other hand, serving an EN-DC-connected UE in the split-uplink mode could involve having the UE split its uplink data flow between its 4G connection and its 5G connection, possibly when the UE's uplink data flow is or may be threshold high. For instance, the UE's 5G connection might be configured as the UE's primary uplink connection, and (i) if and when the UE's uplink data flow and/or quantity of data buffered for uplink transmission is relatively low, the UE could be made to limit its uplink user-plane communication to be on just that 5G connection, but (ii) if and when the UE's uplink data flow and/or quantity of data buffered for uplink transmission is at least as high as a predefined threshold, the UE could be made to split its uplink user-plane communication between its 4G and 5G connections.

To facilitate operation in the split-uplink mode, the 4G eNB 14 could transmit to the UE an RRC message that directs the UE to split its uplink data flow between its 4G and 5G connections. Further, in this RRC message, the 4G eNB 14 could designate an uplink-split ratio, established based on one or more considerations, with the ratio defining what portion of the UE's uplink data the UE should transmit on its 4G connection versus on its 5G connection.

In accordance with this directive, when the UE has data to transmit, (i) the UE could thus send to the 4G eNB 14 a scheduling directive for transmission of a portion of the data, the 4G eNB 14 could schedule that transmission on PRBs of the 4G eNB's air interface, and the UE could engage in the 4G transmission accordingly, and (ii) the UE could send to the 5G eNB 16 a scheduling directive for transmission of another portion of the data, the 5G eNB 16 could schedule that transmission on PRBs of the 5G gNB's air interface, and the UE could engage in the 5G transmission accordingly.

In the example arrangement of FIG. 1, the 4G eNB 14 and 5G gNB 16 may each serve multiple connected UEs at a time. Each such UE may be EN-DC-connected, served concurrently by the 4G eNB 14 and the 5G gNB 16, or may be connected with and served by just one of the access nodes. Thus, the 4G eNB 14 might serve a number of UEs that are EN-DC-connected with the 4G eNB 14 and the 5G gNB 16, and the 4G eNB might serve a number of UEs that have just standalone-4G connectivity with the 4G eNB 14. And 5G gNB 16 might likewise serve a number of UEs that are EN-DC-connected with the 4G eNB 14 and the 5G gNB 16, and the 5G gNB 16 might serve a number of UEs that have just standalone-5G connectivity with the 5G gNB 16.

When an access node serves multiple connected UEs at once, the access node may face a need to schedule uplink data transmissions concurrently from multiple such UEs. Because each access node's air interface has just a finite, limited number of uplink PRBs per unit time (e.g., per subframe), the access node could implement a scheduling algorithm in an effort to fairly and appropriately allocate the PRBs among the access node's served UEs. Yet the access node may still face load issues or may still seek to most efficiently use its available resources.

In this situation, the access node could apply uplink MU-MIMO as noted above, serving multiple UEs at once on the same PRBs as each other, so as to help provide the UEs with a desired level of throughput while also achieving increased spectral efficiency. As further noted above, one way to provide such uplink MU-MIMO service is with use of a massive-MIMO antenna array. Thus, in an example implementation, each access node in FIG. 1 could be equipped with a massive-MIMO antenna array, or one or more of the access nodes might share use of a common such antenna array.

Figure 2:
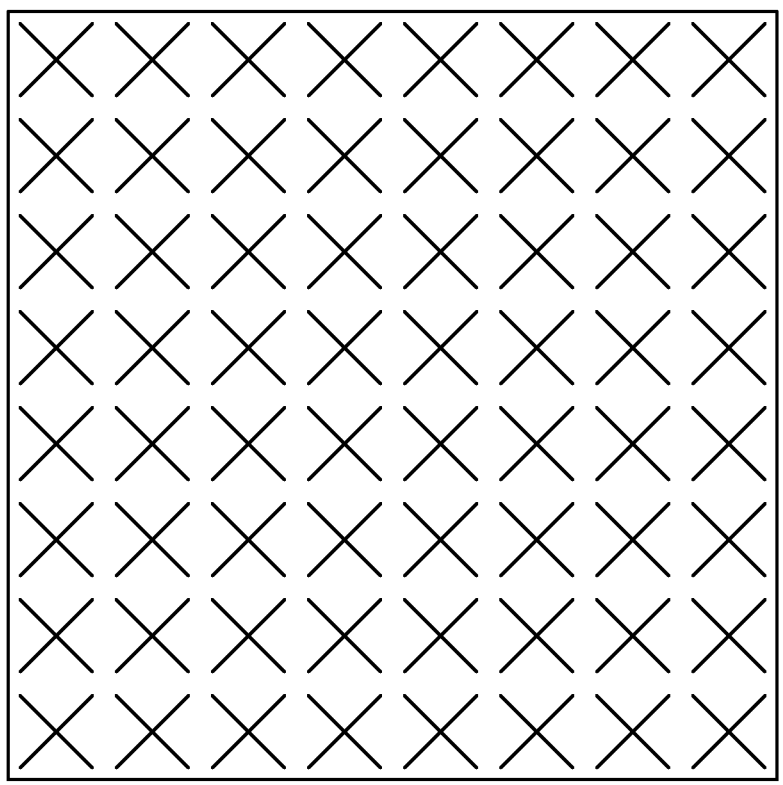
FIG. 2 is a simplified diagram of an example massive-MIMO antenna array that could be implemented according to the disclosure.

FIG. 2 is a simplified diagram of an example massive-MIMO array that could be implemented at or for a representative access node, such as respectively for the 4G eNB 12 and for each 5G gNB 16, 18. In this illustration, each X represents two antennas (or antenna elements), one with positive polarization and one with negative polarization. As a result, each column in the example array includes eight antennas with positive polarization and eight antennas with negative polarization. As there are eight columns of antennas, the example massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this example massive-MIMO antenna array, an access node may be able to provide 16 layers of uplink MIMO transmission. For instance, for each layer, the access node could use 4 of its receive antennas to receive transmission defining a respective MIMO layer. Thus, the access node could in theory receive with up to 16 layers on a common set of air interface resources (e.g., PRBs). Other MIMO arrangements are possible as well.

Assuming sufficient orthogonality between UEs of a group, the access node could thus receive from the UEs of the group on the same PRBs as each other, i.e., at the same time and on the same subcarriers as each other. The transmissions from these UEs would occupy the same PRBs as each other, but could be distinguished from each other through beamforming, pre-coding, and/or one or more other mechanisms.

Thus, in each uplink subframe, the access node could allocate a given set of PRBs to each of multiple UEs of a MU-MIMO group and could receive uplink transmission on the allocated PRB(s) respectively from each UE of the MU-MIMO group, with each UE using one or more MIMO layers respectively. To configure this MU-MIMO service, the access node may engage in signaling with each UE to exchange channel estimates and precoding information, and the access node may work with the UE through DCI signaling to coordinate the UE's transmission.

Though this process, the access node could theoretically allocate all of the uplink PRBs of a subframe to a MU-MIMO group, so that each UE of the MU-MIMO group could engage in data transmission on one or more MIMO layers within all of those PRBs. Alternatively, the access node might allocate some of the uplink PRBs of the subframe to a first MU-MIMO group of UEs and receive from those UEs with MIMO layers on those PRBs, the access node might allocate other uplink PRBs of the subframe to a second MU-MIMO group of UEs and receive from those UEs with MIMO layers on those PRBs, and so forth. Further, the access node might allocate some or all of the uplink PRBs of a given subframe for use without MIMO or in other ways.

As discussed above, an issue in this process could be which UEs the access node should group together for MU-MIMO service, i.e., to transmit on the same air-interface resources (e.g., PRBs) as each other. In practice, the access node could address this question per uplink subframe. For instance, in anticipation of each uplink subframe, the access node could determine, for each of its connected-mode UEs, that the UE has data buffered for uplink transmission, how soon the data needs to be transmitted, and how many UEs are at issue. Further, the access node could consider its air-interface capacity in the subframe, such as how many PRBs are available for the access node to allocate in the subframe. And based on these and/or other factors, the access node could determine that applying MU-MIMO for transmission in the subframe could be helpful, and the access node could then work to determine which of the UEs the access node should group together for MU-MIMO service.

As noted above, the access node could group UEs together for MU-MIMO service with the grouping being based on the UEs of the group being sufficiently orthogonal to each other. As further noted above, the access node could evaluate orthogonality in various ways.

By way of example, the access node could receive from each UE a report of SINR for transmissions from the access node, and the access node could deem a UE to be sufficiently orthogonal to one or more other UEs if the UE's reported SINR is at least threshold high. As another example, by evaluating phases and other metrics for uplink received signals, the access node could determine for each UE what the angle of arrival is for transmissions from the UE, and the access node could deem UEs to be sufficiently orthogonal to each other if their respective angles of arrival are threshold different than each other. And as yet another example, by applying any of various geolocation-determination techniques, the access node could determine the geolocation respectively of each UE, and the access node could deem UEs to be sufficiently orthogonal to each other if their geolocations are threshold far apart from each other.

In accordance with the present disclosure, with the arrangement of FIG. 1 for instance, a computing system could take into account the uplink MU-MIMO grouping efficiency of the 5G gNB 16 as a basis to decide and control whether one or more EN-DC-connected UEs will be served in the single-connection-uplink mode or rather in the split-uplink mode.

Without limitation, the 4G eNB 14 could carry out this process, by determining the uplink MU-MIMO grouping efficiency of the 5G gNB 16 and, based on the determined uplink MU-MIMO grouping efficiency, deciding and controlling whether to have UEs operate in the single-connection-uplink mode or rather in the split-uplink mode. Alternatively, the process could be carried out by the EMS 30 and/or one or more other entities, possibly working in cooperation with the 4G eNB 14.

For instance, the 4G eNB 14 might have a stored operational setting that governs whether split-uplink mode is enabled or rather disabled and therefore whether the 4G eNB 14 would coordinate use of split-uplink mode for EN-DC-connected UEs or would rather have the UEs operate in single-connection-uplink mode. And the 4G eNB 14 could dynamically reconfigure this operational setting based on whether the determined uplink MU-MIMO grouping efficiency of the 5G gNB 16 is at least as high as a predefined threshold level.

If and when the determined uplink MU-MIMO grouping efficiency of the 5G gNB 16 is not as high as the predefined threshold level, the 4G eNB 14 could set the split-uplink mode to be enabled. In that state, if and when an EN-DC-connected UE's uplink data flow or quantity of data buffered for uplink transmission is threshold high, the 4G eNB 14 could responsively direct the EN-DC-connected UE to operate in the split-uplink mode as noted above. (And if and when the UE's uplink data flow or quantity of data buffered for uplink transmission is not threshold high, the 4G eNB 14 could instead responsively direct the UE to operate in the single-connection-uplink mode).

Whereas if and when the determined uplink MU-MIMO grouping efficiency of the 5G gNB 16 is at least as high as the predefined threshold level, the 4G eNB 14 could set the split-uplink mode to be disabled. In that state, the 4G eNB 14 could instead direct an EN-DC-connected UE to operate in the single-connection-uplink mode rather than the split-uplink mode regardless of the UE's uplink data flow or quantity of buffered data, i.e., even if the UE has threshold high uplink data flow or quantity buffered data.

In an example implementation, the uplink MU-MIMO grouping efficiency of the 5G gNB 16 represents the extent to which the 5G gNB 16 has been able to provide MU-MIMO service and could thus be measured as the number of UEs that the 5G gNB 16 has served with uplink MU-MIMO (i.e., as part of an uplink MU-MIMO group) per unit time, among other possibilities. For instance, the uplink MU-MIMO grouping efficiency of the 5G gNB 16 could be computed as an average, over a recent sliding window, of the number of UEs that the 5G gNB has served with MU-MIMO per uplink subframe.

The 4G eNB 14 could determine this uplink MU-MIMO grouping efficiency of the 5G gNB 16 through reporting from the 5G gNB 16 and/or reference to data that indicates a latest measure of the gNB's uplink MU-MIMO grouping efficiency. For instance, the 5G gNB could regularly (e.g., periodically) determine its uplink MU-MIMO grouping efficiency and report this information to the 4G eNB 14 and/or to another entity, such as the EMS 30 or the MME 28, that the 4G eNB 14 might query for the information or that might otherwise provide the information to the 4G eNB 14.

Note also that the uplink MU-MIMO grouping efficiency of the 5G gNB 16 could include current data (e.g., over a most recent or most-recently reported sliding window of time) and/or could include historical data, such as a rolled up average of the 5G gNB's determined uplink MU-MIMO grouping efficiency per time of day or the like over one or more past days, to facilitate a prediction of the 5G gNB's uplink MU-MIMO grouping efficiency at a current time of day. And note that the 4G eNB 14 could keep track over time of the 5G gNB's reported uplink MU-MIMO grouping efficiency.

The 4G eNB 14 could thus monitor the actual or predicted uplink MU-MIMO-grouping efficiency of the 5G gNB 16 over time as basis to dynamically control whether to operate with the split-uplink mode enabled or disabled. And if the determined uplink MU-MIMO grouping efficiency of the 5G gNB 16 varies over time (e.g., as its served UEs are more or less orthogonal with each other), the 4G eNB 14 could therefore dynamically switch between having the split-uplink mode be enabled and having the split-uplink mode be disabled.

Further note that, while the discussion above focuses on an example implementation where the single-connection-uplink mode would limit uplink data flow to the SN's air interface and where split-uplink operation would offload some uplink data flow to the MN's air interface, other arrangements are possible as well. For example, another implementation could involve the single-connection-uplink operation limiting uplink data flow to just the MN's air interface, and split-uplink operation offloading some uplink data flow to the SN's air interface. Here similarly, the level of uplink MU-MIMO grouping efficiency on the MN's air interface could be used as a basis to control whether dual-connectivity service would be provided in the split-uplink mode or rather in the single-connection uplink mode.

And note that the principles discussed herein could extend to apply as well with respect to the downlink. For instance, the access nodes could support providing dual-connectivity service in a single-connection-downlink mode and in a split-downlink mode, and a computing system could determine a downlink MU-MIMO grouping efficiency on the air interface to which downlink communication would be limited in the single-connection-downlink mode and could use the determined downlink MU-MIMO grouping efficiency as a basis to control whether to provide the dual-connectivity service it the split-downlink mode or rather in the single-connection-downlink mode.

Figure 3:
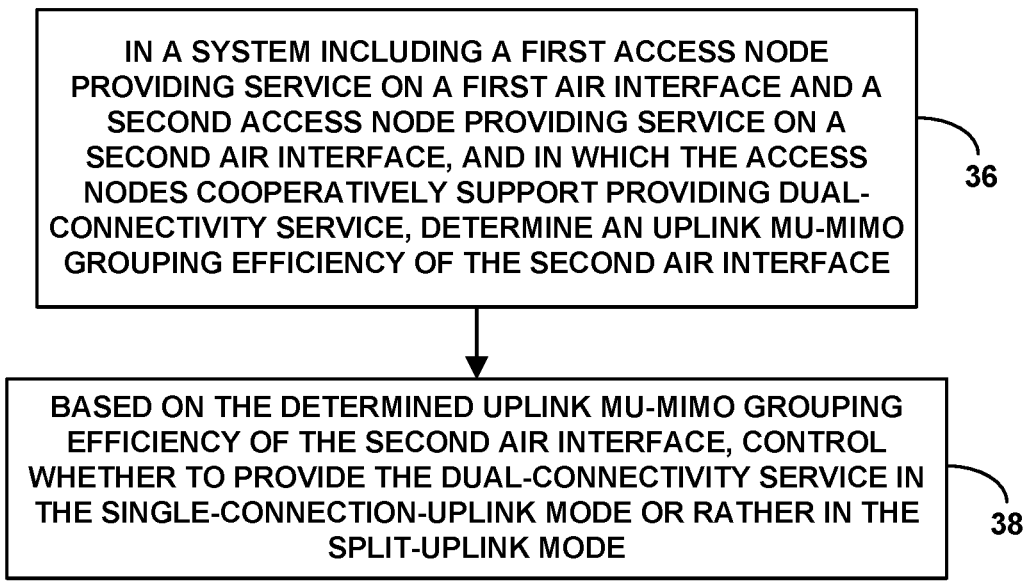
FIG. 3 is a flow chart depicting an example method in accordance with the present disclosure.

FIG. 3 is next a flow chart depicting an example method that could be carried out in accordance with the present disclosure, to control dual-connectivity service in a wireless communication system having a first access node that provides service on a first air interface and a second access node that provides service on a second air interface. As discussed above, the first and second access nodes could support cooperatively providing dual-connectivity service in (i) a single-connection-uplink mode, with uplink user-plane communication being carried on just the second air interface and (ii) a split-uplink mode, with the uplink user-plane communication being split between the first air interface and the second air interface. For instance, one of the access nodes could control which of these modes would be applied for the dual-connectivity service.

As shown in FIG. 3, at block 36, the method includes determining an uplink MU-MIMO grouping efficiency of the second air interface. And at block 38, the method includes, based on the determined uplink MU-MIMO grouping efficiency of the second air interface, controlling whether to provide the dual-connectivity service in the single-connection-uplink mode or rather in the split-uplink mode.

In line with the discussion above, the act of determining the uplink MU-MIMO grouping efficiency of the second air interface could involve receiving from the second access node an indication of the uplink MU-MIMO grouping efficiency, where the uplink MU-MIMO grouping efficiency of the second access node represents an extent to which the second access node provides uplink MU-MIMO service. For instance, the uplink MU-MIMO grouping efficiency of the second air interface could be based on a count of devices that the second access node has served with uplink MU-MIMO per unit time on the second air interface, perhaps based on historical data, over one or more past days, for a current time of day.

As further discussed above, the act of controlling, based on the determined uplink MU-MIMO grouping efficiency of the second air interface, whether to provide the dual-connectivity service in the single-connection-uplink mode or rather in the split-uplink mode could involve (i) making a determination of whether the determined uplink MU-MIMO grouping efficiency of the second air interface is at least as high as a predefined threshold level, (ii) if the determination is that the determined uplink MU-MIMO grouping efficiency of the second air interface is not at least as high as the predefined threshold level, then, based at least on the determination, causing the dual-connectivity service to be provided in the split-uplink mode rather than the single-connection-uplink mode, and (iii) if the determination is that the determined uplink MU-MIMO grouping efficiency of the second air interface is at least as high as the predefined threshold level, then, based at least on the determination, causing the dual-connectivity service to be provided in the single-connection-uplink mode rather than the split-uplink mode.

In addition, the act of making the determination of whether the determined uplink MU-MIMO grouping efficiency of the second air interface is at least as high as a predefined threshold level comprises comparing the determined uplink MU-MIMO grouping efficiency of the second air interface with the predefined threshold level.

As further discussed above, the first access node could have an operational setting that governs whether split-uplink mode is enabled or rather disabled. And the act of causing the dual-connectivity service to be provided in the split-uplink mode rather than the single-connection-uplink mode could involve configuring the operational setting to have the split-uplink mode be enabled, and the act of causing the dual-connectivity service to be provided in the single-connection-uplink mode rather than the split-uplink mode could involve configuring the operational setting to have the split-uplink mode be disabled.

Yet further, as discussed above, the determining and controlling operations of the method could be carried out at least in part by the first access node and/or by an EMS. And as discussed above, the first access node could be a 4G eNB, the second access node could be a 5G gNB, and wherein the dual-connectivity service is EN-DC service.

Figure 4:
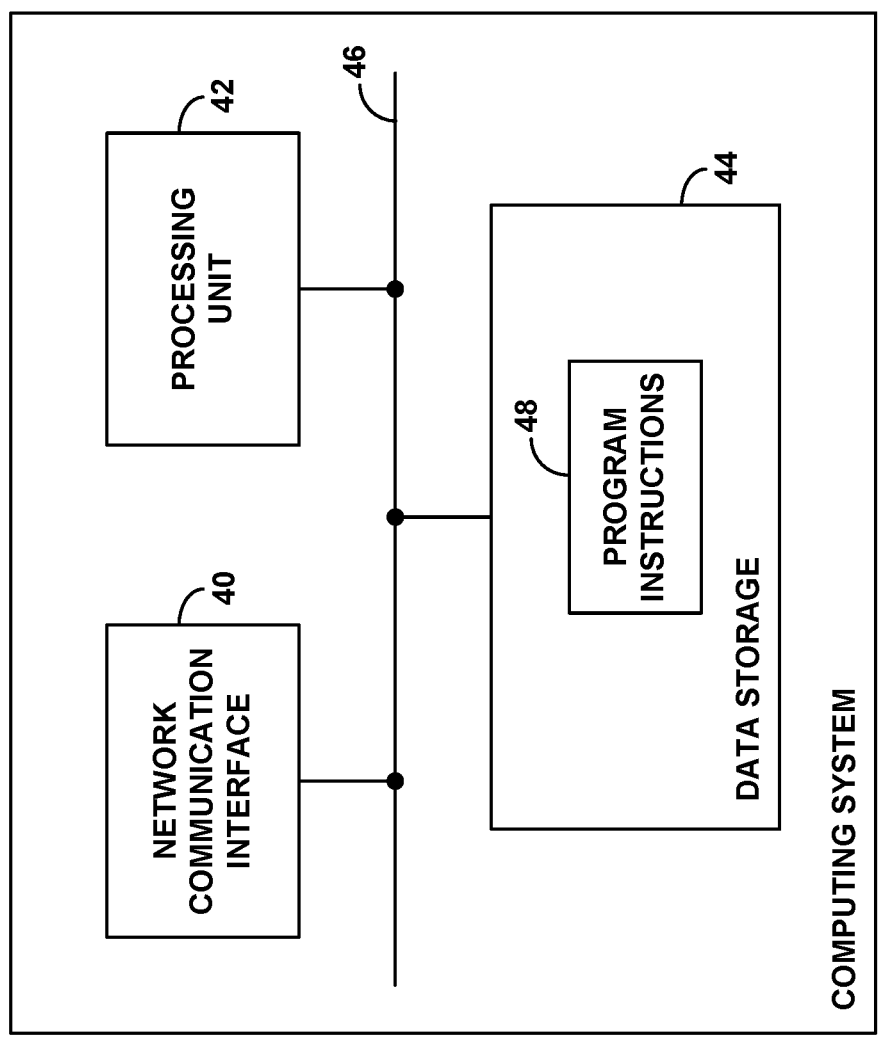
FIG. 4 is a simplified block diagram of an example computing system operable in accordance with the present disclosure.

FIG. 4 is next a simplified block diagram of an example computing system that could be configured to carry out various operations described herein, in a system as described above for instance. This computing system could be disposed at least in part at the first access node and/or in part at an EMS, among other possibilities.

As shown in FIG. 4, the example computing system includes as network communication interface 40, a processing unit 42, and non-transitory data storage 44, all of which could be integrated together and/or interconnected by a system bus, network, or other connection mechanism 46.

The network communication interface 40 could comprise a physical network connector and associated communication logic to facilitate network communication with various other entities. The processing unit 42 could comprise one or more general purpose processors (e.g., microprocessors) and/or one or more special-purpose processors (e.g., application specific integrated circuits). And the data storage 44 could comprise one or more volatile and/or non-volatile storage components (e.g., magnetic, optical, or flash storage).

As shown, the data storage 44 could then store program instructions 48, which could be executable by the processing unit 42 to cause the computing system to carry out various operations described herein. For instance, the instructions could be executable to cause the computing system to carry out operations of FIG. 3.

Various features described above can be implemented in this context as well, and vice versa.

Figure 5:
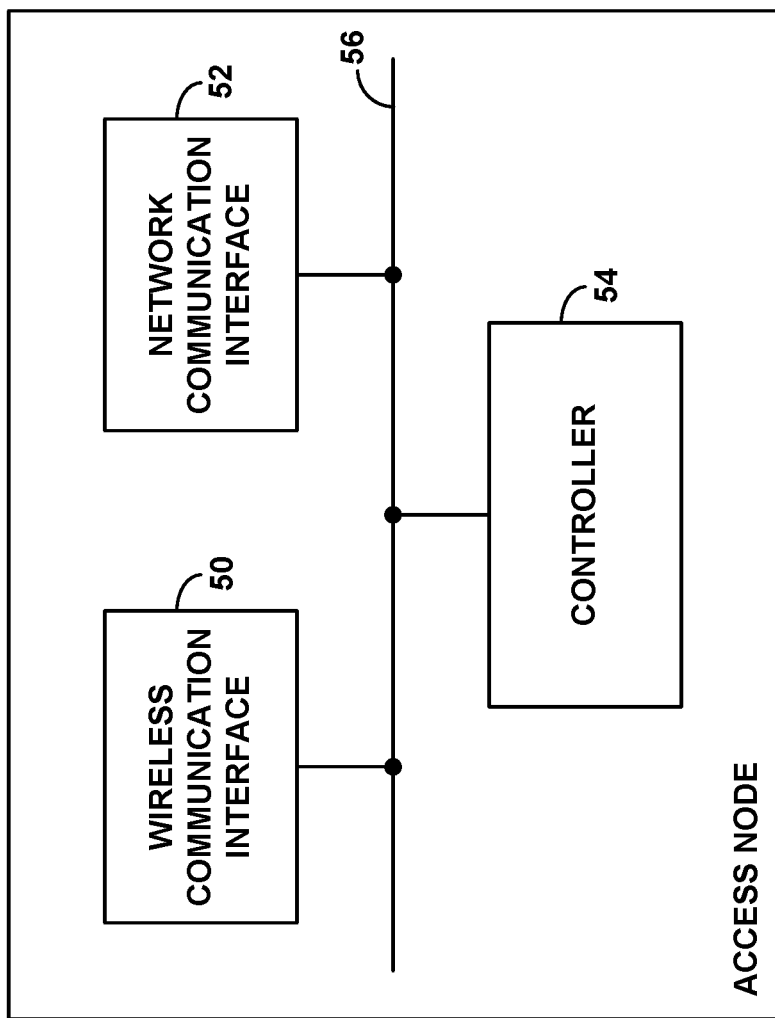
FIG. 5 is a simplified block diagram of an example access node operable in accordance with the present disclosure.

FIG. 5 is next a simplified block diagram of an example first access node that could be configured to operate in accordance with the present disclosure. As shown, the example first access node includes a wireless communication interface 50, a network communication interface 52, and a controller 54, all of which could be integrated together and/or communicatively linked together by a system bus, network, or other connection mechanism 56.

In line with the discussion above, a wireless communication system could include the first access node and a second access node, the first access node could be configured to provide service on a first air interface and the second access node configured to provide service on a second air interface, and the first and second access nodes could support cooperatively providing dual-connectivity service in (i) a single-connection-uplink mode, with uplink user-plane communication being carried on just the second air interface and (ii) a split-uplink mode, with the uplink user-plane communication being split between the first air interface and the second air interface.

In an example implementation, the wireless communication interface 50 could comprise an antenna structure, which could be tower mounted or could take other forms, and associated components such as a power amplifier and a wireless transceiver, so as to facilitate providing a coverage area defining the first air interface and engaging air-interface communication on the first air interface. And the network communication interface 52 could comprise a wired or wireless interface, such as an Ethernet network communication interface, configured to support communication with other entities, such as with the second access node and various core-network entities.

Further, controller 54 could comprise one or more processing units (e.g., one or more general purpose processors and/or specialized processors) programmed to cause the first access node to carry out various operations such as those discussed herein. For instance, the controller could comprise one or more non-transitory data storage units (e.g., one or more magnetic, optical, or flash storage components) which could store program instructions executable by the one or more processing units to cause the first access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling operation in a wireless communication system having a first access node that provides service on a first air interface and a second access node that provides service on a second air interface, wherein the first and second access nodes support cooperatively providing dual-connectivity service in (i) a single-connection-uplink mode, with uplink user-plane communication being carried on just the second air interface and (ii) a split-uplink mode, with the uplink user-plane communication being split between the first air interface and the second air interface, the method comprising:
    determining an uplink Multi-User Multiple-Input-Multiple-Output (MU-MIMO) grouping efficiency of the second air interface, wherein the uplink MU-MIMO grouping efficiency of the second air interface is based on a count of devices that the second access node has served with uplink MU-MIMO per unit time on the second air interface; and
    based on the determined uplink MU-MIMO grouping efficiency of the second air interface, controlling whether to provide the dual-connectivity service in the single-connection-uplink mode or rather in the split-uplink mode.

2. The method of claim 1, wherein determining the uplink MU-MIMO grouping efficiency of the second air interface comprises receiving from the second access node an indication of the uplink MU-MIMO grouping efficiency, wherein the uplink MU-MIMO grouping efficiency of the second access node represents an extent to which the second access node provides uplink MU-MIMO service.

3. The method of claim 1, wherein the uplink MU-MIMO grouping efficiency of the second air interface is based on historical data, over one or more past days, for a current time of day.

4. The method of claim 1, wherein controlling, based on the determined uplink MU-MIMO grouping efficiency of the second air interface, whether to provide the dual-connectivity service in the single-connection-uplink mode or rather in the split-uplink mode comprises:
    making a determination of whether the determined uplink MU-MIMO grouping efficiency of the second air interface is at least as high as a predefined threshold level;
    if the determination is that the determined uplink MU-MIMO grouping efficiency of the second air interface is not at least as high as the predefined threshold level, then, based at least on the determination, causing the dual-connectivity service to be provided in the split-uplink mode rather than the single-connection-uplink mode; and
    if the determination is that the determined uplink MU-MIMO grouping efficiency of the second air interface is at least as high as the predefined threshold level, then, based at least on the determination, causing the dual-connectivity service to be provided in the single-connection-uplink mode rather than the split-uplink mode.

5. The method of claim 4, wherein making the determination of whether the determined uplink MU-MIMO grouping efficiency of the second air interface is at least as high as a predefined threshold level comprises comparing the determined uplink MU-MIMO grouping efficiency of the second air interface with the predefined threshold level.

6. The method of claim 4, wherein the first access node has an operational setting that governs whether split-uplink mode is enabled or rather disabled, and wherein:
    causing the dual-connectivity service to be provided in the split-uplink mode rather than the single-connection-uplink mode comprises configuring the operational setting to have the split-uplink mode be enabled; and
    causing the dual-connectivity service to be provided in the single-connection-uplink mode rather than the split-uplink mode comprises configuring the operational setting to have the split-uplink mode be disabled.

7. The method of claim 1, wherein the determining and controlling are carried out at least in part by the first access node.

8. The method of claim 1, wherein the determining and controlling are carried out at least in part by an element management system.

9. The method of claim 1, wherein the first access node is a 4G Long Term Evolution (LTE) evolved Node-B (eNB), wherein the second access node is a 5G New Radio (NR) next-generation Node-B (gNB), and wherein the dual-connectivity service is EUTRA-NR Dual Connectivity (EN-DC) service.

10. A computing system operable to control dual-connectivity service in a wireless communication system having a first access node that provides service on a first air interface and a second access node that provides service on a second air interface, wherein the first and second access nodes support cooperatively providing the dual-connectivity service in (i) a single-connection-uplink mode, with uplink user-plane communication being carried on just the second air interface and (ii) a split-uplink mode, with the uplink user-plane communication being split between the first air interface and the second air interface, the computing system comprising:
    a network communication interface;
    a processing unit;
    non-transitory data storage; and program instructions stored in the non-transitory data storage and executable by the processing unit to cause the computing system to carry out operations including:

determining an uplink Multi-User Multiple-Input-Multiple-Output (MU-MIMO) grouping efficiency of the second air interface, wherein the uplink MU-MIMO grouping efficiency of the second air interface is based on a count of devices that the second access node has served with uplink MU-MIMO per unit time on the second air interface, and based on the determined uplink MU-MIMO grouping efficiency of the second air interface, controlling whether the dual-connectivity service will be provided in the single-connection-uplink mode or rather in the split-uplink mode.

11. The computing system of claim 10, wherein determining the uplink MU-MIMO grouping efficiency of the second air interface comprises receiving from the second access node an indication of the uplink MU-MIMO grouping efficiency, wherein the uplink MU-MIMO grouping efficiency of the second access node represents an extent to which the second access node provides uplink MU-MIMO service.

12. The computing system of claim 10, wherein controlling, based on the determined uplink MU-MIMO grouping efficiency of the second air interface, whether to provide the dual-connectivity service in the single-connection-uplink mode or rather in the split-uplink mode comprises:

making a determination of whether the determined uplink MU-MIMO grouping efficiency of the second air interface is at least as high as a predefined threshold level;

if the determination is that the determined uplink MU-MIMO grouping efficiency of the second air interface is not at least as high as the predefined threshold level, then, based at least on the determination, causing the dual-connectivity service to be provided in the split-uplink mode rather than the single-connection-uplink mode; and if the determination is that the determined uplink MU-MIMO grouping efficiency of the second air interface is at least as high as the predefined threshold level, then, based at least on the determination, causing the dual-connectivity service to be provided in the single-connection-uplink mode rather than the split-uplink mode.

13. The computing system of claim 10, wherein the computing system is disposed at least in part at the first access node.

14. The computing system of claim 10, wherein the computing system is disposed at least in part at an element management system.

15. In a wireless communication system having a first access node that provides service on a first air interface and a second access node that provides service on a second air interface, wherein the first and second access nodes support cooperatively providing dual-connectivity service in (i) a single-connection-uplink mode, with uplink user-plane communication being carried on just the second air interface and (ii) a split-uplink mode, with the uplink user-plane communication being split between the first air interface and the second air interface, the first access node comprising:

a wireless communication interface through which to engage in air-interface communication on the first air interface; and a controller, wherein the controller is configured to cause the first access node to carry out operations including:

determining an uplink Multi-User Multiple-Input-Multiple-Output (MU-MIMO) grouping efficiency of the second air interface, wherein the uplink MU-MIMO grouping efficiency of the second air interface is based on a count of devices that the second access node has served with uplink MU-MIMO per unit time on the second air interface, and based on the determined uplink MU-MIMO grouping efficiency of the second air interface, controlling whether to provide the dual-connectivity service in the single-connection-uplink mode or rather in the split-uplink mode.

16. The first access node of claim 15, wherein the controller comprises at least one processing unit, at least one non-transitory data storage, and program instructions stored in the at least one non-transitory data storage and executable by the at least one processing unit to cause the first access node to carry out the operations.

17. The first access node of claim 15, wherein controlling, based on the determined uplink MU-MIMO grouping efficiency of the second air interface, whether to provide the dual-connectivity service in the single-connection-uplink mode or rather in the split-uplink mode comprises:

making a determination of whether the determined uplink MU-MIMO grouping efficiency of the second air interface is at least as high as a predefined threshold level;

if the determination is that the determined uplink MU-MIMO grouping efficiency of the second air interface is not at least as high as the predefined threshold level, then, based at least on the determination, causing the dual-connectivity service to be provided in the split-uplink mode rather than the single-connection-uplink mode; and if the determination is that the determined uplink MU-MIMO grouping efficiency of the second air interface is at least as high as the predefined threshold level, then, based at least on the determination, causing the dual-connectivity service to be provided in the single-connection-uplink mode rather than the split-uplink mode.

\* \* \* \* \*